(12) United States Patent
Wang

(10) Patent No.: US 11,425,344 B2
(45) Date of Patent: Aug. 23, 2022

(54) OPTICAL DEVICE WITH PHASE MODULATION LAYER AND PHASE COMPENSATING LAYER

(71) Applicant: Shenzhen Photonic Crystal CO. LTD, Shenzhen (CN)

(72) Inventor: Yongjing Wang, Shenzhen (CN)

(73) Assignee: Shenzhen Photonic Crystal CO. LTD, Shenzhen (CN)

( * ) Notice: Subject to any disclaimer, the term of this patent is extended or adjusted under 35 U.S.C. 154(b) by 618 days.

(21) Appl. No.: 15/959,229

(22) Filed: Apr. 22, 2018

(65) Prior Publication Data
US 2018/0309967 A1    Oct. 25, 2018

Related U.S. Application Data

(60) Provisional application No. 62/488,818, filed on Apr. 23, 2017.

(51) Int. Cl.
| | |
|---|---|
| *H04N 9/31* | (2006.01) |
| *G02B 26/06* | (2006.01) |
| *H04N 13/302* | (2018.01) |
| *H04N 13/393* | (2018.01) |
| *H04N 13/337* | (2018.01) |
| *H04N 13/363* | (2018.01) |
| *G03B 21/60* | (2014.01) |
| *G02B 30/50* | (2020.01) |
| *G02B 5/124* | (2006.01) |
| *G03B 21/604* | (2014.01) |
| *G02B 30/25* | (2020.01) |

(52) U.S. Cl.
CPC .......... *H04N 9/3132* (2013.01); *G02B 26/06* (2013.01); *G02B 30/50* (2020.01); *G03B 21/60* (2013.01); *G03B 21/604* (2013.01); *H04N 13/302* (2018.05); *H04N 13/337* (2018.05); *H04N 13/363* (2018.05); *H04N 13/393* (2018.05); *G02B 5/124* (2013.01); *G02B 30/25* (2020.01)

(58) Field of Classification Search
None
See application file for complete search history.

(56) References Cited

U.S. PATENT DOCUMENTS

| | | | | |
|---|---|---|---|---|
| 6,353,489 | B1 * | 3/2002 | Popovich | G02B 5/09 359/15 |
| 2014/0253605 | A1 * | 9/2014 | Border | G02B 27/017 345/690 |
| 2017/0235219 | A1 * | 8/2017 | Kostamo | G03F 7/0002 264/40.1 |

* cited by examiner

*Primary Examiner* — Robert E. Tallman
(74) *Attorney, Agent, or Firm* — W&K IP

(57) ABSTRACT

An optical device is disclosed. The optical device has 1) a phase modulation layer, 2) a partially reflective layer, and 3) a phase compensation layer. When incident lights pass through the phase modulation layer, the partially reflective layer reflects and scatters the light back to the viewers. The direction and profile of the reflected light are determined by the phase modulation profile. When light passes through both the phase modulation layer and the phase compensation layer, its phase modulation is compensated to a substantially small level. Therefore, the transparent light passes through the optical device just like passing through a parallel transparent substrate without any disturbance.

15 Claims, 11 Drawing Sheets

OPTICAL DEVICE WITH PHASE MODULATION LAYER AND PHASE COMPENSATING LAYER

CROSS-REFERENCE TO RELATED APPLICATIONS

This application claims priority of U.S. Provisional Patent Application No. 62/488,818, filed Apr. 23, 2017, the entire contents of which are incorporated herein by reference.

TECHNICAL FIELD OF THE INVENTION

The present invention relates to an optical display system, more specifically to a transparent optical device that displays images.

BACKGROUND OF THE INVENTION

A transparent (see-through) display is an electronic display that can show information on the display while allowing the user to see through the display and the outside world. Many applications require a fully transparent screen that displays a vivid colored picture so that augment information can be overlapped with real world. The applications include transparent digital signage in retail stores, showcases in museums and exhibits, heads up displays (HUD) in automobiles and even the augment reality (AR) display systems. Traditionally there are several methods to implement a transparent display. These methods include transparent LCD/OLED displays, partially transparent projection screens, and transparent LED displays etc. All these methods use a part of the display pixels to display content while keeping other parts of the display pixels transparent. They are unclear and their transparency is low. Thus their applications are limited.

There is a need for transparent displays with better transparency and more vivid colors.

SUMMARY OF THE INVENTION

This patent discloses an optical device having a phase modulation layer, a reflection layer, and a compensating phase layer. The phase modulation layer can be made from optical transparent material such as optical glass and optical polymer material. The phase modulation layer creates a pseudo-random surface that can manipulate light by changing the direction of its energy. Not only can the light direction be controlled by the phase modulation layer, but also the distribution of light energy can be redistributed to a desired pattern. The reflection layer can be multilayer dielectric coating or one layer optical material with a substantial difference in refractive index (n), or a metal or metal alloy coating.

When the light is incident onto the phase modulation layer and then the reflection layer, parts of the light are reflected back, and parts of the light pass through. The reflected light undergoes phase modulation by the phase modulation layer. Therefore, its direction and distribution are manipulated to get a desired reflection direction and reflection/scattering pattern. The patent of phase modulation can be generated by Computer Generated Holography (CGH), surface relief grating, surface relief light scattering pattern, and binary optics, etc. CGH is the method of digitally generating holographic interference patterns. A holographic image can be generated, e.g., by digitally computing a holographic interference pattern and printing it onto a mask or film for subsequent illumination by a suitable coherent light source. The pattern of the phase modulation determines the light distribution pattern after the reflection.

When light from a projector is incident to the phase modulation layer, the light is redirected to the eyes of viewers to generate a picture. On the other hand, when the light is incident from opposite direction, it passes through the phase modulation layer and then phase compensation layer. All phase modulations are compensated out. Therefore, the light passes through all layers undisturbed, and the projection film is fully transparent to the light.

When the projection film is used together with a projector, it can produce vivid and glowing pictures floating in the air. It is a fully transparent screen that will not disturb lights from outside. Viewers can see vivid pictures from a projector and the outside world. The computer-generated information can be overlapped with the real world. It can generate a futuristic and 3D hologram display effect.

The present invention discloses a projection film that selectively redirects the light from a projector to the eyes of the viewers; in the meantime it has no effect on the passing through light. The viewers can see the objects behind the screen. The projected images are overlapped with the real world objects to achieve the effect of augmented reality. It enables many unique applications like digital signage advertisement, showcase in museums and exhibits, and HUD in cars.

The present invention discloses a projection film that can maintain the polarization of the light projected onto it. Therefore, it can be used as a 3D projection film.

The present invention discloses a projection film that selectively redirects the light from a projector to eyes of the viewers; in the meantime it redirects the ambient light to other directions. Therefore, it can be used as an ambient light rejection projection film to improve the contrast of projected images under normal ambient light.

Additional embodiments of the projection film will be apparent from the detailed description and claims that follow. Those skilled in the art will appreciate that the concepts and specific embodiments disclosed herein can be modified, such as by designing different phase modulation patterns, while carrying out the same essential purposes of the present invention. Such equivalent constructions are encompassed by the disclosure of the invention.

DETAILED DESCRIPTION OF THE INVENTION

Figure 1:
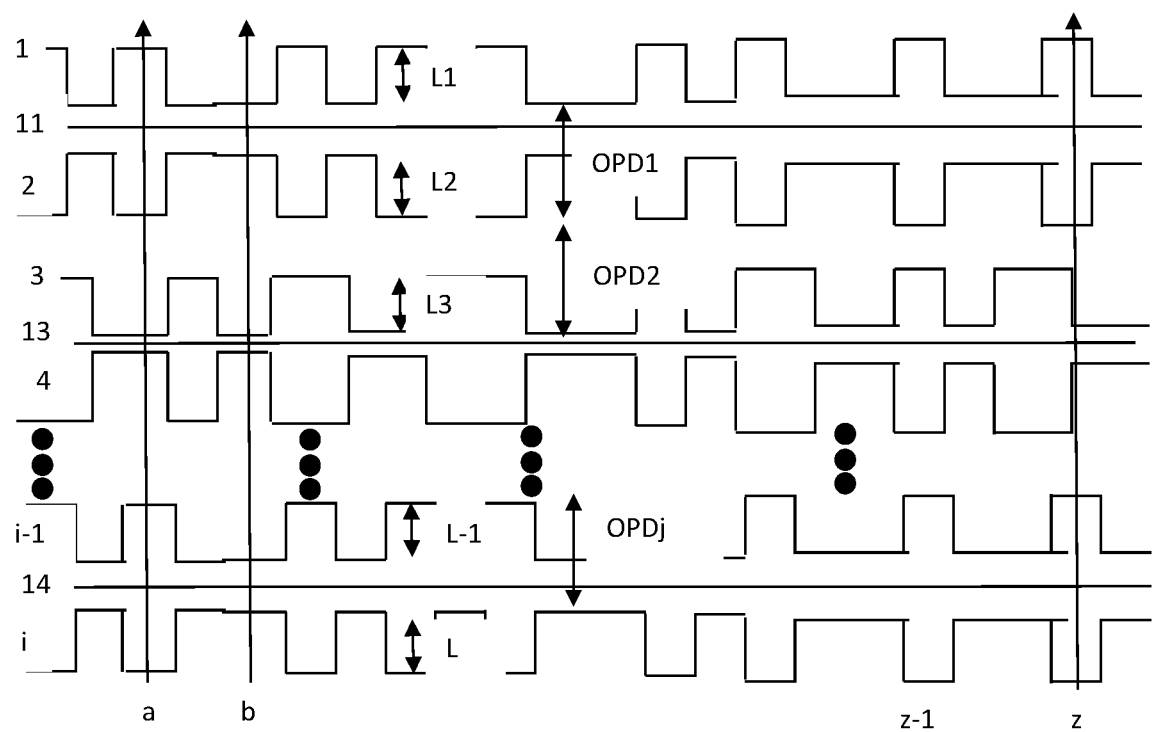
FIG. 1: Cross section of the projection film of the first embodiment.

The first embodiment of the present invention, as shown in FIG. 1, is a projection film having at least one structure that further comprises 1) a first optical structure (1) with nano or micro meter scale phase modulation structure; 2) a second optical structure (2) with nano or micro meter scale phase compensating structure that compensates the first optical substrate; and 3) a partially transparent and reflective layer (11) in between the first optical structure and second optical structure that reflects partially the light back and allows the light partially passing through. In an additional embodiment, the structure above is repeated multiple times to form a multiple layer structure (from 1 and 2 to i−1 and i). Different light rays (from a, b to z; please note the alphabet is just for denoting different rays, and it is not limited to 26) pass through the optical film at different locations and different angles.

In optics, optical path length (OPL) or optical distance is the product of the geometric length of the path light (L1, L2, to Li) that follows through the system, and the index of refraction (n) of the medium through which it propagates (OPL=Li*n). A difference in OPL between two paths is often called the optical path difference (OPD). OPL is important because it determines the phase of the light and governs interference and diffraction of light as it propagates. The OPL between the first and the second optical structures is OPD1. The first optical structure and second optical structure have opposite optical phases, and therefore, they compensate each other. The total optical path lengths for all light rays (a to z) passing through the whole film are a constant C.

$$\sum_{1}^{i} OPDi = C$$

Where C is a constant, OPDi is the phase modulation for each optical structure, and i=1 to i for different optical layers.

The optical manufacture process of the phase modulation structures are produced using methods including but not limited to optical etching, optical lithography, nano pressing, nanoimprinting, etc.

Figure 2:
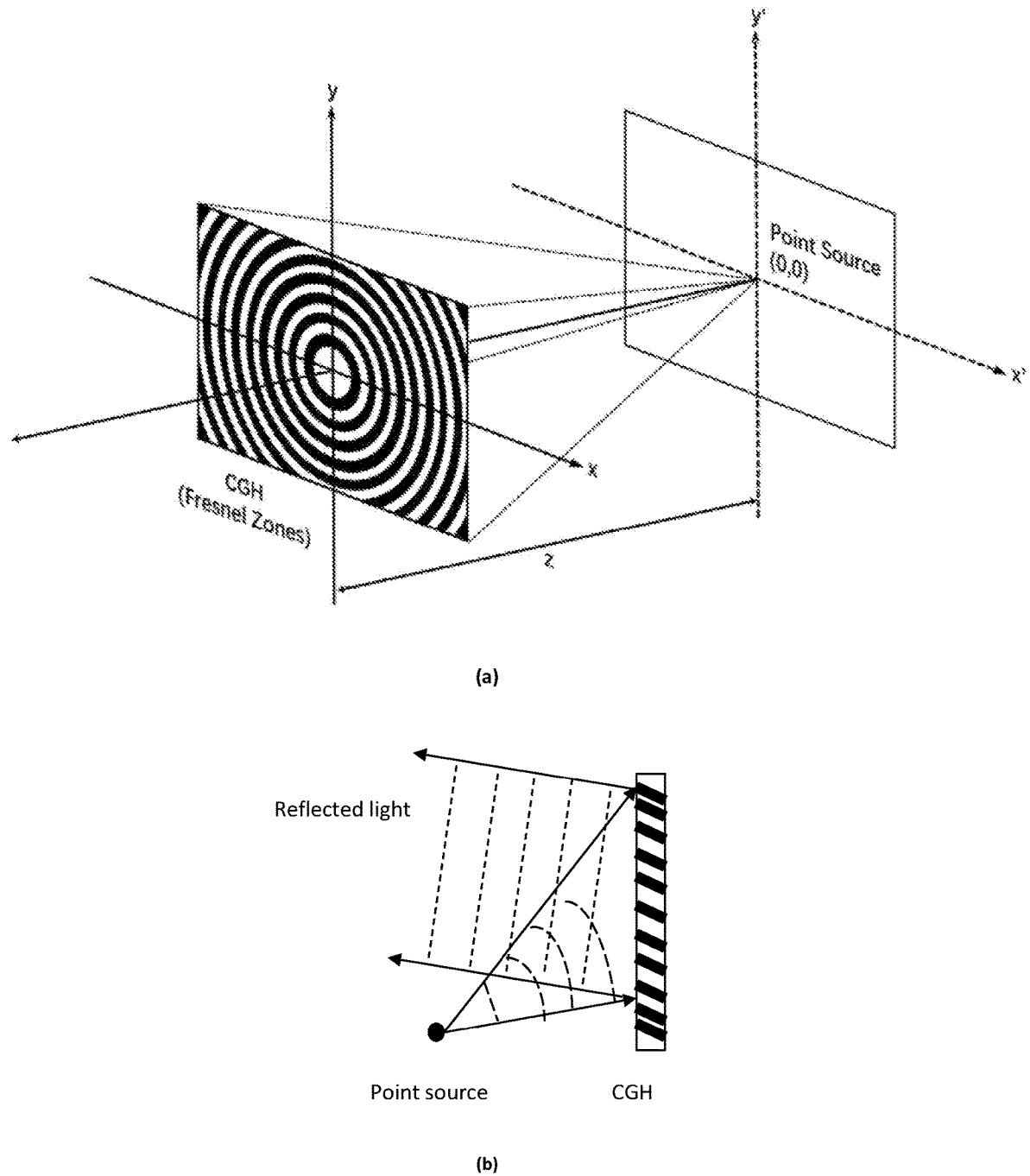
FIG. 2: (a) CGH from a point source; (b) CGH reflects the point source to certain direction.

The nano or micro meter scale phase structure in the first embodiment can be implemented via different approaches including but not limited to scattering surface relief structure, grating, and CGH. In one embodiment the surface relief structures can be replicated from a holographically-recorded master. These pseudo-random, non-periodic structures can manipulate light by changing the direction of its energy. The result is the elimination of Moiré, color over-angle, and precise angular beam control. In another embodiment, the phase modulation layer is CGH structure as shown in FIGS. 2(*a*) and (*b*). In one example, the CGH structure can be designed by computational strategy based on the point source concept, where the object is broken down in self-luminous points shown in FIG. 2(*a*). An elementary hologram is calculated for every point source and the final hologram is synthesized by superimposing all the elementary holograms. The light from a point source will be reflected to a certain direction.

Those of ordinary skill in the art will better appreciate the features and aspects of such embodiments, and others, upon review of the remainder of the specification. There are different phase modulation layers that can redirect the light to different directions with different distribution angles, without departing from the scope of the disclosed technology and methodology.

An additional embodiment of present invention further emcompasses multiple units (i) of the first optical structure and second optical structure. The number i ranges from 1 to 500. The OPD between the first and the second optical structures is OPDj. Each unit (i) is designed to reflect a certain wavelength of light to certain direction. For a full color display, three colors—red, green and blue—are needed, and therefore, i may be greater than 3. But for simplicity and cost reasons, an i value lower than 3 also works. The OPD for different reflecting rays from different units are constructive to each other.

In all embodiments, the overall optical path differences between all optical structures is substantially small, and therefore, the optical film has a uniform optical path across the film. It is fully transparent for the light passing through the optical film. Therefore, it will not disturb the light passing through, and the viewers can see the object clearly behind the screen.

Figure 3:
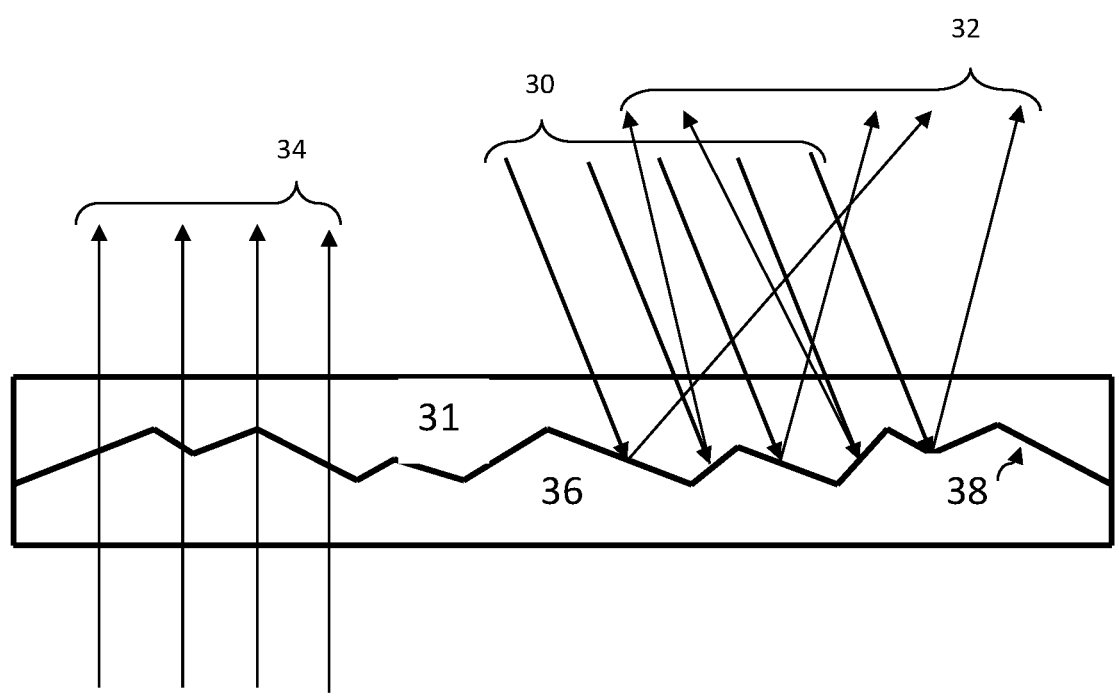
FIG. 3: Cross section of the projection film of the second embodiment.

The second embodiment, shown in FIG. 3, comprises a phase modulation layer (31), a partially reflective layer (38) and a phase compensation layer (36). When incident light 30 passes through the phase modulation layer (31), the partially reflective layer (38) reflects and scatters the light back (32). The direction and profile of the reflected light (32) are determined by the phase modulation profile. The phase modulation profile is designed to achieve certain reflection pattern to meet the requirement of applications.

In one embodiment, the phase modulation is randomized so that rays incident on the surface are scattered into different directions to increase the viewing angle. In another embodiment, the surface relief structures can be replicated from a holographically-recorded master. These pseudo-random, non-periodic structures can manipulate light by changing the direction of its energy. The result is the elimination of Moiré, color over-angle, and precise angular beam control. For reflected light, the substrate acts as a projection screen.

On the other hand, when light (34) passes through the phase compensation layer (36), its phase is modulated. Then it passes through the phase modulation layer (31), its phase modulation is compensated to a substantially small level. Therefore, the transparent light passes through the optical device just like passing through a parallel transparent substrate without any disturbances. So the viewer will see a non disturbed outside view.

The reflection layer (38) can be a multilayer dielectric coating, a single layer made of an optical material with a substantially different refractive index, or a metal or alloy coating. The reflection spectrum can be designed using a traditional multilayer optical design tool. In one embodiment, a single layer transparent optical material with substantially different refractive index compared with the layer (31) is used. In another embodiment, a multi layer transparent dielectric material with certain refractive index and optical thickness is used. For those projectors with narrower red, green, and blue light bands like projectors with a laser light source, the reflection spectrum is designed to reflect more lights at wavelengths from the projector while allowing lights at other wavelengths from the outside world pass through. Therefore, the brightness of displayed image and transparency of the optical film can be both optimized.

In a further embodiment, the phase composition structure is formed automatically by using a liquid or curable optical resin with a substantially similar refractive index (n) compared with the phase modulation structure. When the optical resin is applied to the phase modulation structure and cured, it automatically compensates the phase modulation structure.

Figure 4:
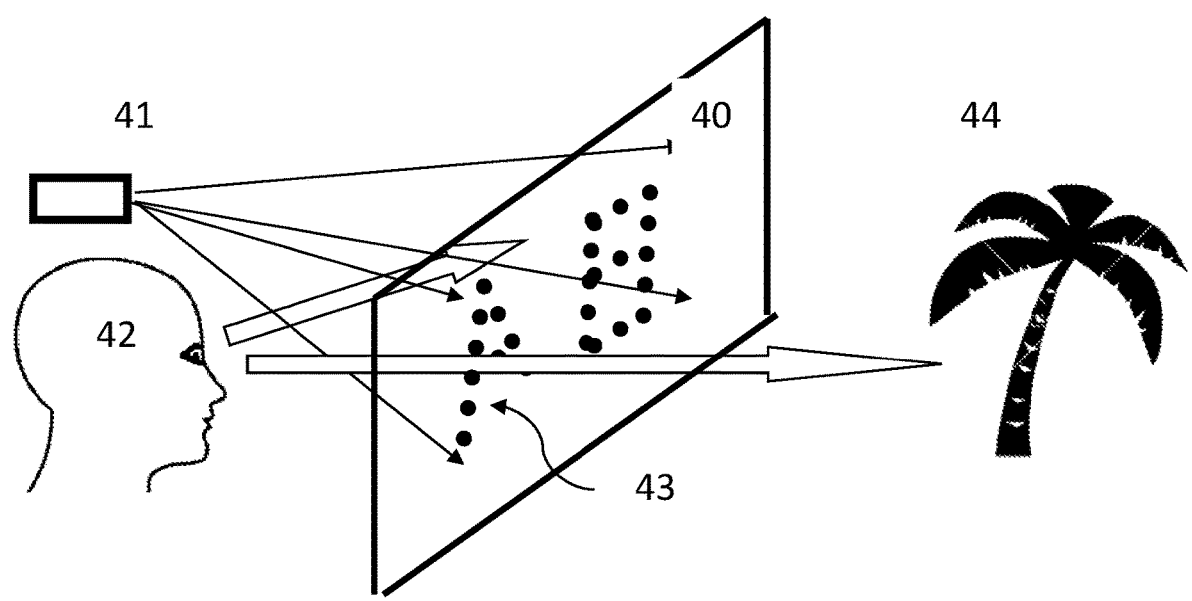
FIG. 4: The user case of the present invention.

A further embodiment of present invention, illustrated in FIG. 4, includes 1) a projection film described in previous embodiment (40); 2) a projector (41) that projects a picture (43) onto the projection film (40). The viewer (42) sees the projected picture and outside view (44) at the same time. The projected picture (43) can be related or not related to the outside view (44). The projected picture (43) provides further information to the outside view (44) to generate augmented reality.

Figure 5:
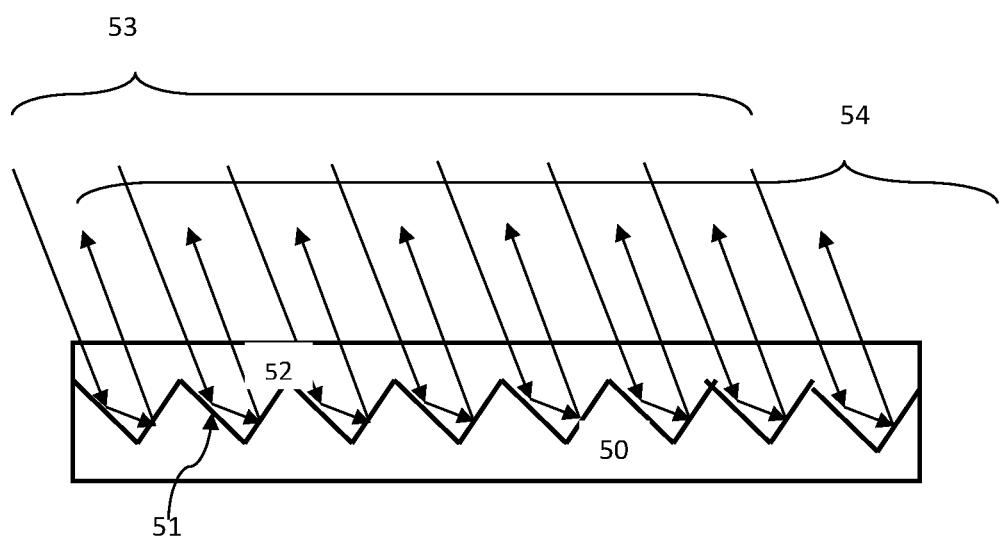
FIG. 5: Optical film with corner cube phase modulation structure.

The direction and profile of the reflected light are determined by the phase modulation profile. The phase modulation profile is designed to achieve a certain reflection pattern. To those who are skilled in the art, there exists many phase modulation profile designs. Another embodiment of present projection film, as shown in FIG. 5, comprises 1) a first substrate (50) with nano or micro meter scale phase modulation structure that is a corner cube array (51); 2) a partially transparent and reflective layer on the corner cube array (51) that partially reflects the light (54) back and pass partially the light through; 3) the second phase compensation substrate that substantially compensates the phase difference caused by the first substrate (50). The corner cube array (51) reflects the incident ray (53) back to its original incident direction (54). The corner cube array (51) also slightly scatters the light (53) to increase the viewing angle. The scattered light cone of the light (53) should be smaller than the separation of two eyes.

Figure 6:
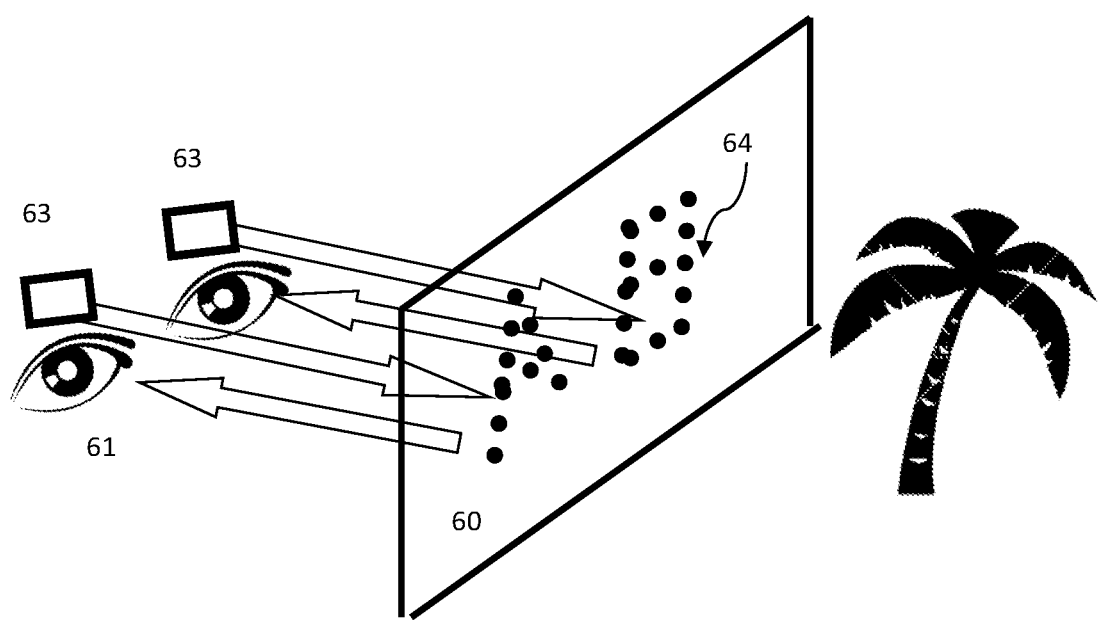
FIG. 6: 3D display with optical film with corner cube micro structure.

A further embodiment, shown in FIG. 6, further comprises two projectors (63) mounted substantially close to two eyes (61) of the viewer. The two projectors produce two different images (64) for two different eyes, and therefore, a 3D image is generated on a fully transparent substrate. Further, it comprises a slight scattering structure to generate large enough eye box for each eye. Therefore, 3D display system for naked eye is achieved.

Figure 7:
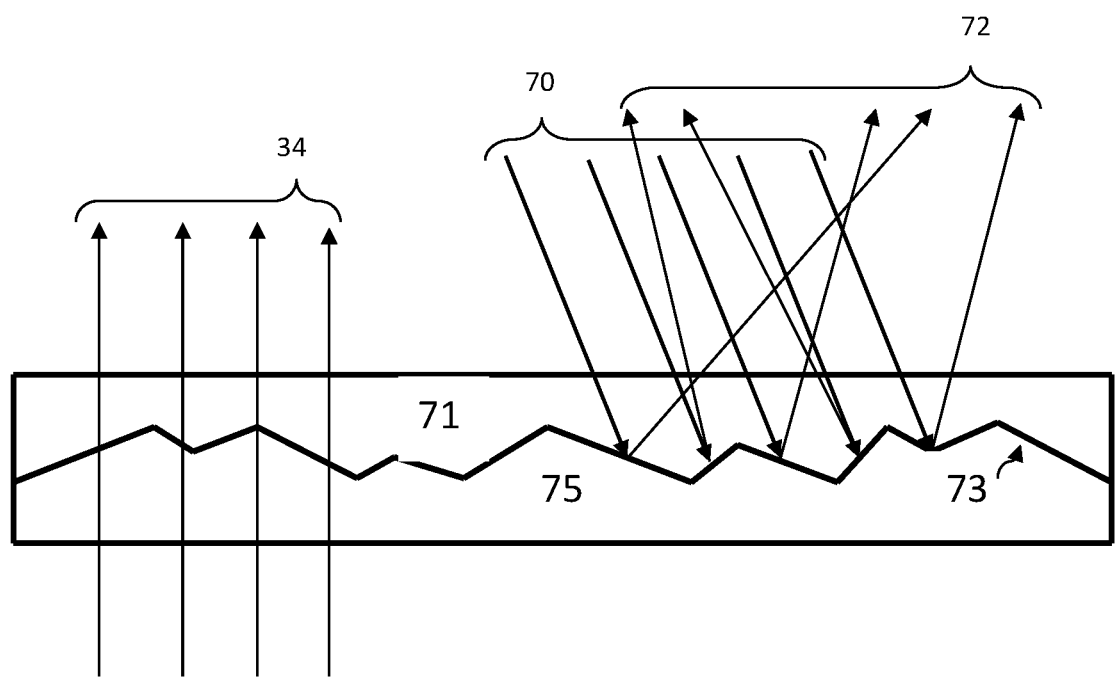
FIG. 7: Cross section of the projection film of the embodiment for 3D display.

Another embodiment of present patent application, shown in FIG. 7, comprises a phase modulation layer (71), a partially reflective layer (73) and a phase compensation layer (75). When incident light (70) passes through the phase modulation layer (71), the partially reflective layer (73) reflects and scatters the light back (72). The partially reflective layer maintains the polarization of the reflected light (72). Therefore, the optical film can be used for 3D projection displays. The viewer wears passive polarization 3D glasses to see 3D images projected by a 3D projector. Therefore, 3D display system with passive glasses is achieved.

Figure 8:
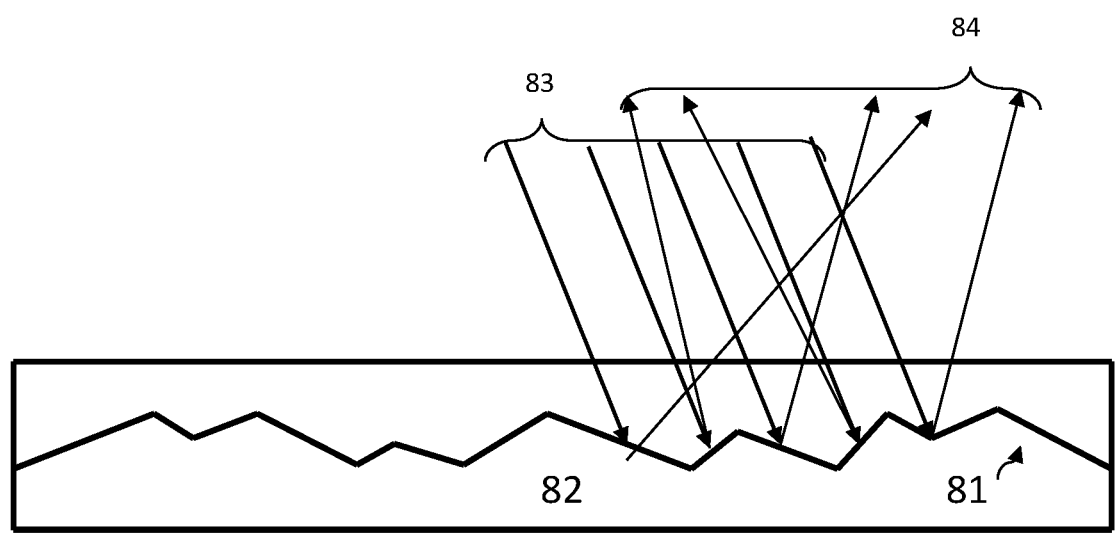
FIG. 8: 3D display with optical film with passive polarization glasses.

Another simplified embodiment, shown in FIG. 8, comprises a reflective layer (81) and a phase compensation layer (82). The incident light (83) is reflected by the reflective layer (81). The reflection layer (81) maintains the polarization of the reflected light (84). Therefore, the optical film can be used for 3D projection displays. If the viewer wears passive polarization 3D glasses, the viewer can see the 3D image projected by a 3D projector.

Figure 9:
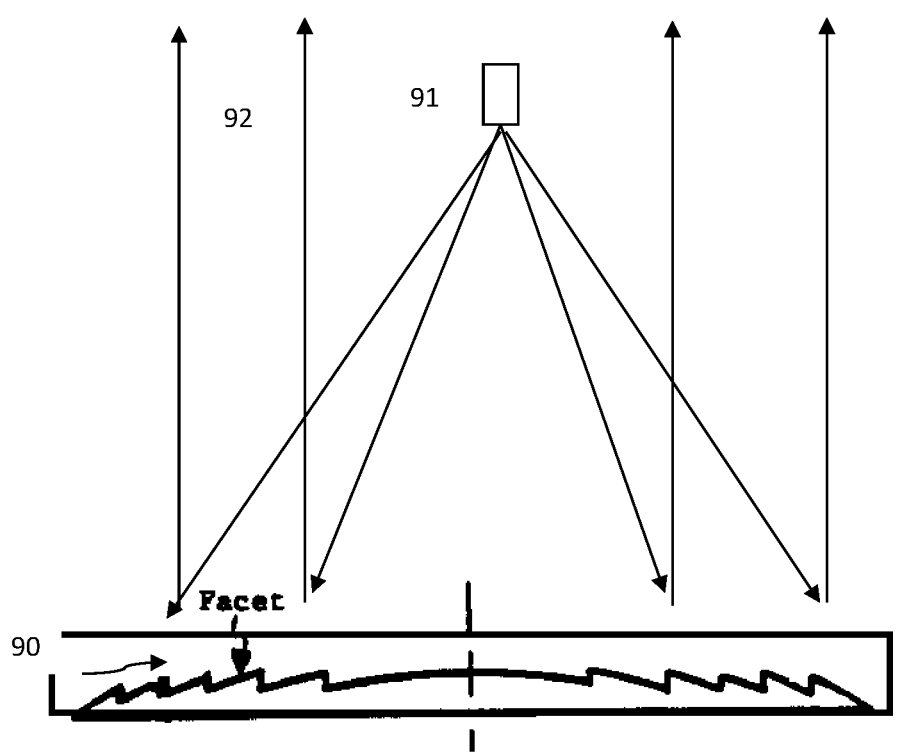
FIG. 9: The embodiment with Fresnel microstructure.

In another embodiment as shown in FIG. 9, the phase modulation structure is a Fresnel lens (90), and the light from the projector (91) is distributed to a substantial parallel direction (92). Furthermore, it comprises a slight scattering structure to generate enough viewing angle for the viewers.

Figure 10:
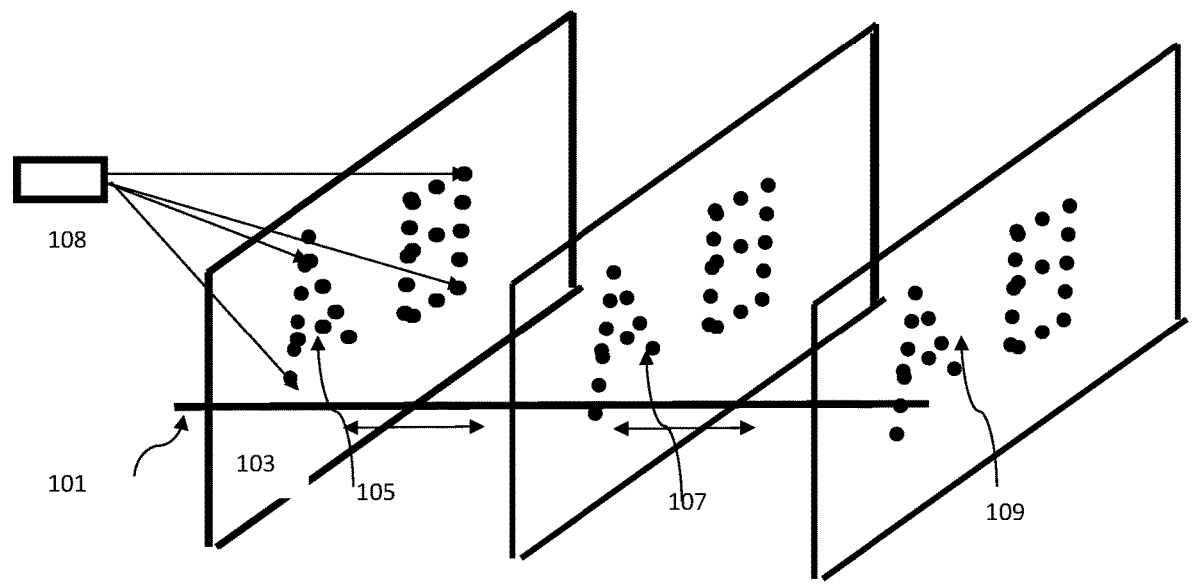
FIG. 10: Light Field 3D using Z scanning mechanism.

A further embodiment of projection film as shown in FIG. 10, further comprises an optical device (100), which is mounted on a rail or spiral axis (101). The projection substrate (100) is scanned back and forth in a volume. It further includes a projector (103), which projects images at different layers (105, 107, 109, and so on) of a 3D object, where the images are synchronized with a scanning mechanism. Every layer of the 3D object in the volume is reproduced in the space volume. A 3D object is reconstructed for viewers. Viewers can see the 3D object without any glasses.

Figure 11:
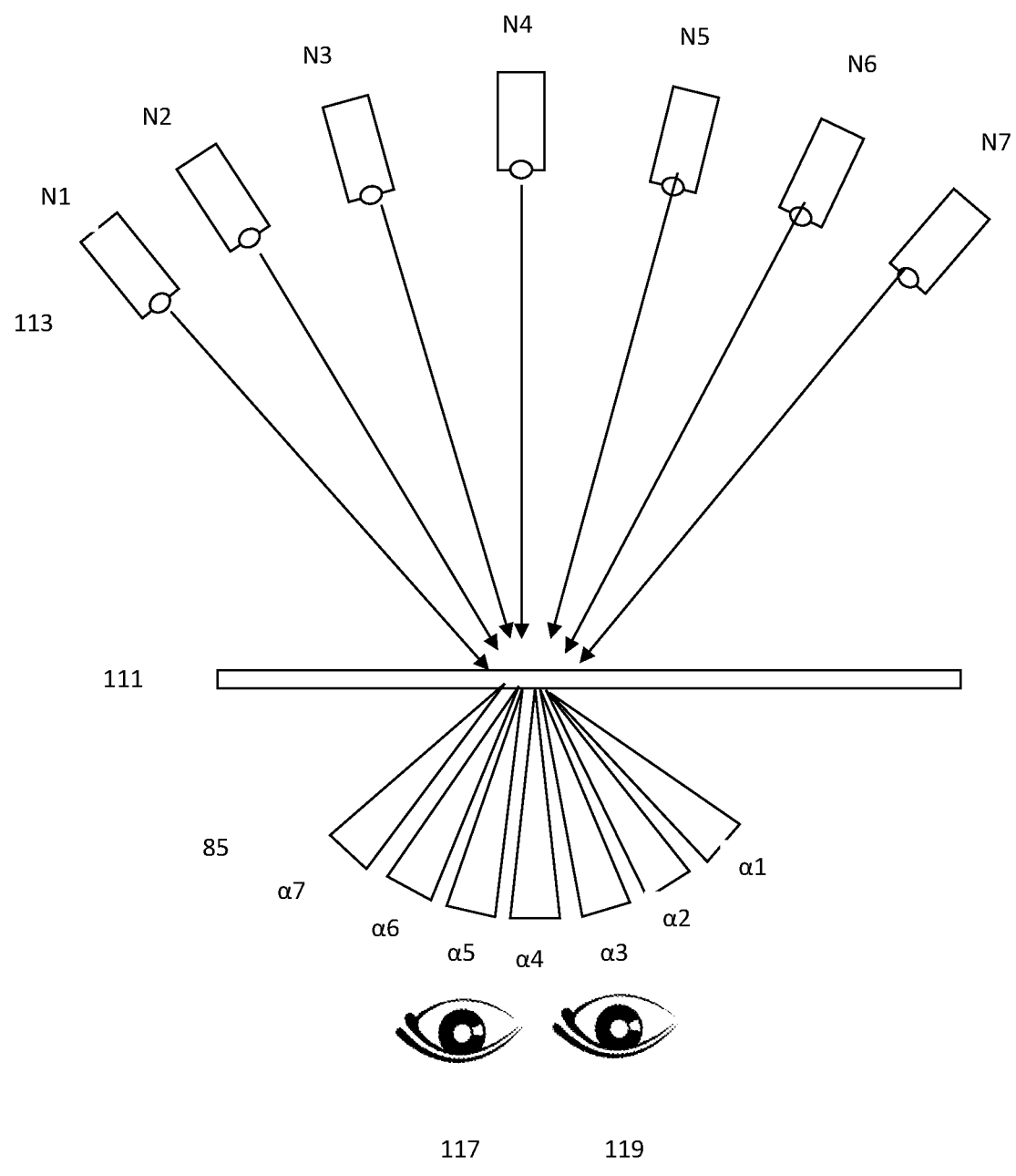
FIG. 11: Light Field 3D using angular projection.

A further embodiment of optical device as shown in FIG. 11, further comprises 1) a transparent projection substrate (111); and 2) multiple projectors (110, denoted by N1 to N7, the number of projectors should be greater than two). The projectors project images at different angles ($\alpha 1$ to $\alpha 7$) of a 3D object, and the images are synchronized for all different angles. The images of all different angles of the 3D object in the volume are reproduced in the space. A 3D object is reconstructed for viewers. Viewers see the 3D object without any glasses. Typically the number of projectors is larger than two. Normally seven projectors produce a good 3D effect. The more the projectors used, the better the 3D effect is.

Another embodiment of present patent application comprises 1) an optical device as described in claim 1; 2) a projector displays images; and 3) a controller to display information related to the vehicle.

I claim:

1. An optical device comprising one or more structures, wherein each structure comprises, in order of distance from a viewer, 1) a first optical structure with nano or micrometer scale phase modulation structure; 2) a partially transparent and partially reflective layer that partially reflects light back and partially passes light through; and 3) a second optical structure with phase compensating structure that substantially compensates any phase modulation caused by the first optical structure.

2. An optical device according to claim 1, wherein the first optical structure is computer generated hologram.

3. An optical device according to claim 1, wherein the first optical structure is scattering surface relief pattern.

4. An optical device according to claim 1, wherein the first optical structure has a pseudo-random scattering surface relief pattern to control the direction and distribution of the light energy.

5. An optical device according to claim 1, wherein the first optical structure is a micro corner cube array.

6. An optical device according to claim 1, wherein the second optical structure is formed automatically when the first optical structure is laminated with a soft or liquid curable optical material.

7. An optical device comprising one or more structures, wherein each structure comprises, in order of distance from a viewer, 1) a first optical structure with nano or micrometer scale phase modulation structure; 2) a partially transparent and partially reflective layer that partially reflects light back and partially passes light through; and 3) a second optical structure with phase compensating structure that substantially compensates any phase modulation caused by the first optical structure, wherein when incident light is projected, the partially transparent and partially reflective layer maintains the polarization of the light.

8. An optical device comprising one or more structures, wherein each structure comprises, in order of distance from a viewer, 1) a first optical structure with nano or micrometer scale phase modulation structure; 2) a partially transparent and partially reflective layer that partially reflects light back and partially passes light through; and 3) a second optical structure with phase compensating structure that substantially compensates any phase modulation caused by the first optical structure, wherein when light from a projector is incident, the partially transparent and partially reflective layer reflects the light from the projector and redirects ambient light away from the viewer to improve the contrast of the projector.

9. An optical device according to claim 4, further comprising two projectors mounted substantially close to two eyes of the viewer, wherein the two projectors produce two different images for two different eyes such that a 3D image is generated.

10. An optical device according to claim 1, wherein the phase modulation structure is a Fresnel lens array.

11. A 3D optical display device, comprising an optical device according to claim 1, wherein the optical device scatters incident light to a light cone smaller than the distance between right and left eyes; and a plurality of projectors for generating 3D images without the need of wearing glasses.

12. A 3D optical display device, comprising an optical device according to claim 1, wherein the optical device is mounted on a rail or spiral axis; and a projector projecting images at different layers of a 3D object; wherein the projected images are synchronized with scanning of the rail or the axis to generate 3D images.

13. An optical manufacture process comprising, Step 1: making a first optical substrate with nano or micrometer scale phase modulation structure; Step 2: coating a partially transparent and reflective layer that partially reflects light back and partially passes light through; and Step 3: making a second optical substrate with phase compensating structure that substantially compensates any phase modulation caused by the first optical substrate, wherein the first optical substrate, the partially transparent and partially reflective layer, and the second optical substrate are ordered based on the distance from a viewer from the closest to the farthest.

14. An optical manufacture process according to claim 13, wherein Step 3 further comprises applying a liquid or deformable layer of optical material on the first optical substrate, wherein the liquid or deformable layer of optical material has an refractive index substantially close to the refractive index of the first optical substrate.

15. An optical display device for vehicles, comprising an optical device according to claim 1, a projector for displaying images, and a controller to display information related to the vehicle.

* * * * *